United States Patent [19]

Garner

[11] 4,077,392

[45] Mar. 7, 1978

[54] NOVEL SOLAR COLLECTOR

[76] Inventor: Richard L. Garner, 2211 Walker Ave., Greensboro, N.C. 27403

[21] Appl. No.: 710,859

[22] Filed: Aug. 2, 1976

[51] Int. Cl.$^2$ .................................................. F24J 3/02
[52] U.S. Cl. .................................... 126/271; 237/1 A; 350/293
[58] Field of Search ............... 126/270, 271; 237/1 A; 60/641; 350/293, 299

[56] References Cited

U.S. PATENT DOCUMENTS

| 1,683,266 | 9/1928 | Shipman | 126/271 |
| 2,133,649 | 10/1938 | Abbot | 126/271 |
| 2,872,915 | 2/1959 | Bowen | 126/271 |
| 3,847,136 | 11/1974 | Salvail | 126/271 |

FOREIGN PATENT DOCUMENTS

| 2,461,973 | 7/1974 | Germany | 126/271 |

Primary Examiner—Kenneth W. Sprague
Assistant Examiner—James C. Yeung

[57] ABSTRACT

This invention comprises a light weight, inexpensive solar energy collector having an elongated arcuate reflecting member which can be used as an independent energy collector or in combination with other, similar units.

9 Claims, 7 Drawing Figures

NOVEL SOLAR COLLECTOR

BACKGROUND AND OBJECTIVES OF THE INVENTION

In recent years more attention has been given to solar energy as a possible alternative for energy generated by other means such as coal, gas oil and hydroelectric power. Along with the rising cost of these energy sources, materials that are manufactured for use in solar energy systems such as mirrors, heat conduits and insulation have also risen until the cost of "inexpensive" solar energy is no longer necessarily "inexpensive".

Solar energy collectors in the past have been difficult to transport, handle and assemble, due in part to their large reflective surfaces and integral construction. Also, past units have been sized according to the particular job requirements and adjustments in the area of reflective surface available, have been difficult to make.

With these shortcomings in mind, it is one object of the present invention to provide a solar energy collector of inexpensive design and construction.

It is another object of this invention to provide a solar energy collector which can be easily transported, handled and assembled.

It is yet another object of this invention to provide a solar energy collector which can be used either alone or in combination with other similar solar energy collectors should a greater amount of energy be required than that developed by a single unit.

It is still another object of the present invention to provide a solar energy collector having an improved heat collector member which will transfer the energy quickly and efficiently to a desired location.

Still another object of the present invention is to provide a solar energy collector having a rotatable reflective surface which can be adjusted to best take advantage of the sun's position.

A final object of the present invention is to provide a solar energy collector which has a cover member to protect the reflective surface and heat collector member from rain, snow, hail, or atmospheric pollutants which it may encounter.

DESCRIPTION OF THE DRAWINGS AND SUMMARY OF THE INVENTION

Figures 3, 5:
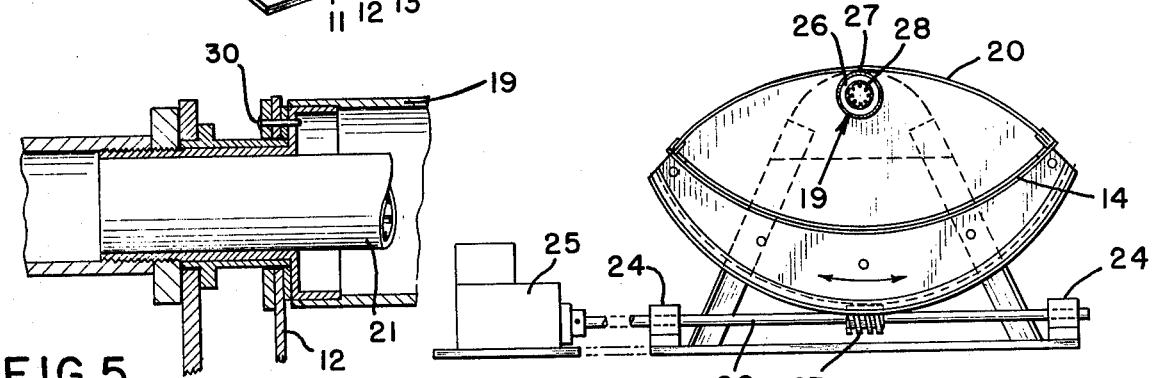
Figure 4:
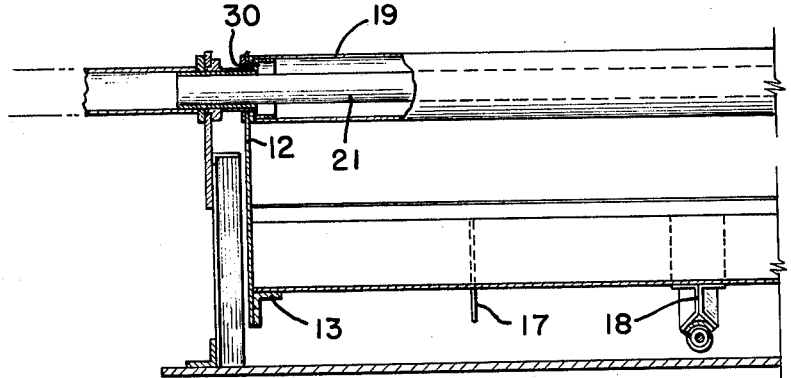
Figure 6:
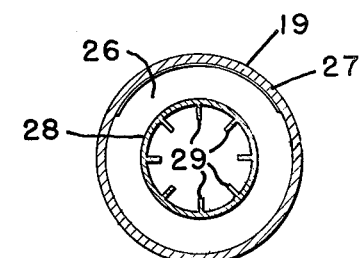
Figure 7:
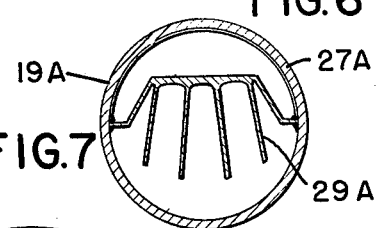

FIG. 3 demonstrates a cross sectional end view of the solar collector showing the rotatable drive assembly;

FIG. 4 illustrates a schematic cross section of the solar energy collector including the heat collector member;

FIG. 5 is an enlarged cross section view of the heat collector member as it appears at one end of the solar energy collector;

FIG. 6 is an enlarged cross section of one embodiment of the heat collector member; and FIG. 7 is yet another embodiment of the heat collector member which can be utilized in the solar energy collector.

In brief, to explain the operation of this solar collector, rays from the sun strike its arcuate reflecting surface and are reflected and focused on the heat collecting member positioned at a predetermined distance from the reflective surface. The heat collector member contains either a gas or liquid for absorbing the energy and conveying it to a desired location where it is then released for a useful purpose, such as for heating or cooking. The collector is provideded with a rotatable drive assembly to aim the arcuate reflective member to best take advantage of the most intense rays from the sun. The rotatable drive assembly can be either hand operated or automatic, depending upon its particular application required. When more than one energy collector is used at the same location, a tandum arrangement may be utilized whereby the solar energy collectors will rotate in unison for the best direction relative to the sun.

DETAILED DESCRIPTION OF THE DRAWINGS AND PREFERRED EMBODIMENT

Figure 1:
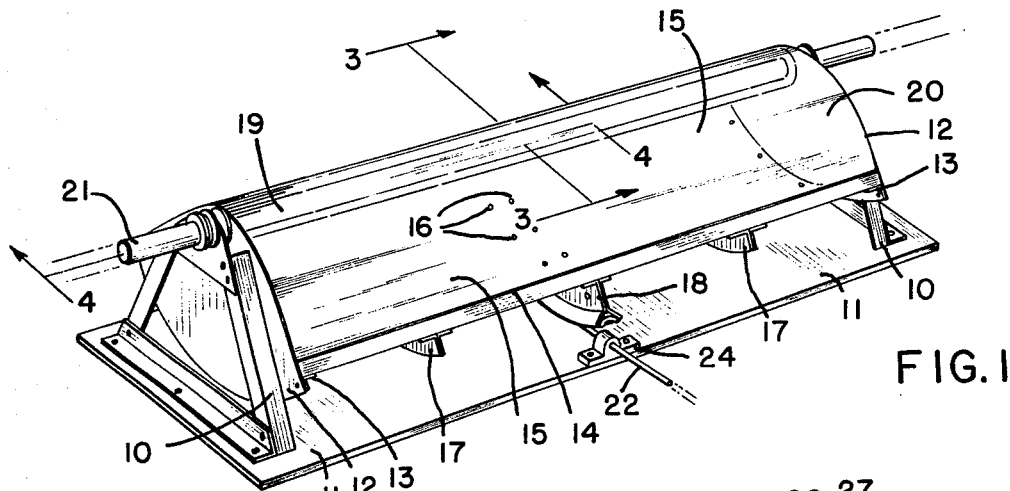
FIG. 1 shows a top plan view of the solar energy collector as it may be mounted for use.

In FIG. 1 the preferred embodiment is displayed showing frame 10 being rigidly affixed to base 11 which, for example, could be a roof section. Attached to frame 10 in pivotable connection are collector support plates 12 which includes an arcuate base portion 13. Reflective shell member 14 having an outer highly polished reflective surface 15 is rigidly affixed to the arcuate base portion by rivets 16, though other securing means can be employed such as bolts or adhesives. Support ribs 17 are also arcuately shaped and are affixed to the reflective shell member 14 which may be for example, a thin sheet of aluminum with its outer side highly polished. Center rib 18 contains a gear member (not shown) for use in focusing the reflective shell member 14. Heat collector member 19 is shown under transparent collector cover 20 which prevents rain, hail and other detrimental forces from striking reflective surface 15 of shell member 14. Heat collector member 19 is positioned radially relative to the reflective surface 15 to receive the energy rays reflected therefrom and to transfer the energy collected by a selected fluid through inner conduit and into a hose (not shown) or other piping means to a desired location for use.

Figure 2:
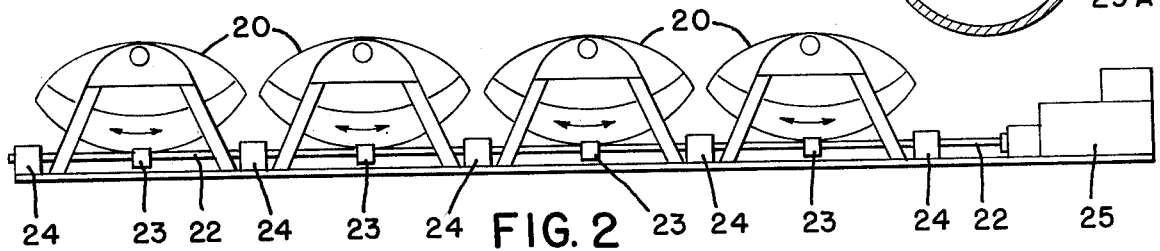
FIG. 2 shows a tandum arrangement of four solar energy collectors as depicted in FIG. 1.

As shown in FIG. 2, a series of solar energy collectors may be joined in unison by a single drive shaft 22 which is pivotably mounted and which contains an independent worm 23 for rotation of the gear contained in center rib 18. Pillow blocks 24 hold drive shaft 22 in straight, direct alignment with the gears (not shown) contained in center ribs 18 and with the gear motor 25, used to rotate drive shaft 22. It is understood that gear motor 25 can be remotely activated automatically or manually to rotate the reflective surfaces for their most efficient position relative to the sun.

Heat collector member 19 is shown in FIG. 3 having a space 26 between outer transparent shell member 27 and inner conduit 28. Fins 29 are radially positioned ribs which longitudinally extend throughout collector member 19 and are spaced apart for maximum efficiency. Air space 26 provides additional insulation between outer transparent shell member 27 and inner conduit 28. An enlarged view is seen in FIG. 6 of the heat collector member 19.

FIG. 4 shows a schematic front elevational view of the preferred embodiment of the solar energy collector showing the center support rib 18 and support ribs 17. Heat collector member 19 is shown with a portion of outer transparent surface 27 removed. Inner conduit 21 is displayed as passing through collector support plate 12. Internal conduit 21 can be adapted to either rotate in cooperation with arcuate shell member 14 as drive shaft 19 revolves, or conduit 21 can be designed with proper seals to remain stationary when arcuate shell member 14 oscillates.

In FIG. 5, pin 30 is shown passing through collector plate 12 and into heat collector member 19. With the pin 30 so inserted, heat collector member 19 rotates with the oscillatory movement of shell member 14 as worm 23 drives the gear (not shown) in center rib 18. With pin member 30 removed, worm 23 can drive the gear member (not shown) in center rib 18 and heat collector member 19 remains stationary. FIG. 7 demonstrates another embodiment of a heat collector member 19 as heat collector member 19A. Heat collector member 19A has a series of longitudinally extending spaced apart rib members 29A disposed within outer shell member 27A. Substantially parallel rib members 29A provide additional efficiency and minimize heat losses due to the reabsorption of any reflected or reradiated energy rays. Water or other suitable fluids including gases can be employed to transmit the heat in conduit 28 to the desired location, and when several collectors are joined in unison, the conduits 28 can be connected in fluid communication with one another as is common practice in the art.

Other embodiments and variations of this invention can be made but such modifications do not depart from the scope intended herein.

I claim:

1. A solar heat energy collector comprising; a pair of axially spaced-apart collector supporting plates, each of said plates having an arcuate base portion, an arcuate reflecting shell member secured to the arcuate base portions of said collector supporting plates, a frame for cooperatively supporting and pivotally mounting said supporting plates in spaced relation to said reflecting member, a heat collecting member extending axially and parallel to said arcuate reflecting member and equiradially spaced therefrom, said heat collecting member being supported on each frame and circumscribed by said collector supporting plates, said heat collecting member having a fluid passageway extending longitudinally therethrough, a disengageable collecting member securing means attaching said collector member to said supporting plates, a fluid transfer medium retained for flow through said heat collecting member, and heat transfer means supported in its said heat collecting means in the path of flow of said fluid whereby solar energy reflected from said arcuate reflecting shell member will be transmitted to said fluid through said heat collecting means and heat transfer means to said fluid transfer medium flowing through said heat collecting means.

2. A solar heat energy collector as claimed in claim 1, wherein said heat transfer means comprises a plurality of longitudinally extending spaced-apart rib members.

3. A solar heat energy collector as claimed in claim 2, wherein said rib members are radially positioned in said fluid passageway.

4. A solar heat energy collector as claimed in claim 1, wherein said arcuate reflecting shell member comprises a polished aluminum sheet.

5. A solar heat energy collector as claimed in claim 1, wherein said fluid medium comprises water.

6. A solar heat energy collector as claimed in claim 1, wherein said fluid medium comprises a gas.

7. A solar heat energy collector as claimed in claim 6, wherein said gas comprises air.

8. A solar heat energy collector comrising a plurality of individual solar heat energy collectors as claimed in claim 1, said individual collectors being cooperatively connected and movable in unison and means for rotating at least one of said individual collectors.

9. A solar heat energy collector as claimed in claim 8, wherein said fluid passageways of said individual solar heat energy collectors are in fluid communication.

* * * * *